United States Patent [19]

Murakami et al.

[11] Patent Number: 5,700,509
[45] Date of Patent: Dec. 23, 1997

[54] METHOD OF FRACTIONATING AN EDIBLE OIL CONTAINING 2-PALMITOYL-1,3-DIOLEYLGLYCEROL

[75] Inventors: Mototake Murakami; Seiichiro Aoe, both of Sayama; Kiyoshi Tatsumi, Iruma, all of Japan

[73] Assignee: Snow Brand Milk Products Co., Ltd., Japan

[21] Appl. No.: 335,125

[22] Filed: Nov. 7, 1994

[30] Foreign Application Priority Data

Nov. 24, 1993 [JP] Japan .................... 5-317392

[51] Int. Cl.$^6$ ...................................... A23D 7/00
[52] U.S. Cl. .............................. 426/495; 426/601
[58] Field of Search ..................... 426/601, 495, 426/417

[56] References Cited

U.S. PATENT DOCUMENTS

| | | | |
|---|---|---|---|
| 2,910,363 | 10/1959 | Ruben | 426/417 |
| 4,004,041 | 1/1977 | Koslowsky | 426/417 |
| 4,016,302 | 4/1977 | Kattenberg et al. | 426/607 |
| 4,104,290 | 8/1978 | Koslowsky | 426/417 |
| 4,560,655 | 12/1985 | Baker | 435/241 |
| 4,590,087 | 5/1986 | Pronk et al. | 426/603 |
| 4,845,028 | 7/1989 | Imamura et al. | 435/15 |

FOREIGN PATENT DOCUMENTS 2178752  2/1987  United Kingdom.

OTHER PUBLICATIONS

Chemical Abstracts 74:2844.
Chemical Abstracts 83:130261.
Chemical Abstracts 84:30353.
Chemical Abstracts 88:103518.
Chemical Abstracts 113:170554.
Chemical Abstracts 116:57781.
Chemical Abstracts 118:123288.
Food Science & Technology Abstracts 71(07):N0282.
Gunstone 1983 Lipida in Foods Chemistry, Biochemistry and Technology Pergamon Press New York pp. 140–142.
Cohen, B., et al., "Dietary Fat and Fatty Acids Modulate Cholesterol Cholelithiasis in the Hamster", *Lipids,* 27, No. 7:526–532 (1992).
Santaren, J., et al., "Thermal and $^{13}$C–NMR Study of the Dynamic Structure of 1–Palmitoyl–2–Oleyl–sn–Glycero–3–Phosphocholine and 1–Oleyl–2–Palmitoyl–sn–Glycero–3–Phosphocholine in Aqueous Dispersions", *Biochimica et Biophysica Acta,* 687:231–237 (1982).
Lien, Eric, "The Role of Fatty Acid Composition and Positional Distribution in Fat Absorption in Infants", *The Journal of Pediatrics,* 125 No. 5, Part 2:S62–S68 (1994).
Morimoto, K., et al., "Acyl Chain Length Dependency of Diacylglycerol Cholinephosphotransferase and Diacylglycerol Ethanolaminephosphotransferase", *The Journal of Biological Chemistry,* 253, No. 14:5056–5060 (1978).
Muranishi, S., et al., "Trials of Lipid Modification of Peptide Hormones for Intestinal Delivery", *Journal of Controlled Release,* 19:179–188 (1992).
Tagiri, M., et al., "The Digestability of Branched–Chain Triacylglycerols and Their Effects on Plasma and Hepatic Lipid Levels in the Rat" *Biosci. Biotech. Biochem.,* 58(6):1093–1096 (1994).

*Primary Examiner*—Carolyn Paden
*Attorney, Agent, or Firm*—Testa, Hurwitz & Thibeault, LLP

[57] ABSTRACT

The present invention provides a well-digestible and well-absorbable edible oil and fat composition containing 20% by weight or more 2-palmitoyl-1,3-dioleylglycerol. Also a process for production of the above edible oil and fat composition which comprises fractionating the edible oil and fat composition to increase the content of 2-palmitoyl-1,3-dioleylglycerol to 20% by weight or more is disclosed. The edible oil and fat composition of the present invention is useful as a fat material used in diets for infants or for the sick.

7 Claims, No Drawings

METHOD OF FRACTIONATING AN EDIBLE OIL CONTAINING 2-PALMITOYL-1,3-DIOLEYLGLYCEROL

BACKGROUND OF THE INVENTION

1. Field of the Invention

The present invention relates to well-digestible and well-absorbable edible oil and fat composition with high proportion of 2-palmitoyl-1,3-dioleylglycerol and a process for production thereof. Edible oil and fat composition of the present invention which contains 2-palmitoyl-1,3-dioleylglycerol is well-digestible and well-absorbable, and useful as an oil and fat material used in diets for babies or for the sick.

2. Background of the Invention

Recently, nutritional physiology of oil and fat is being studied mainly on physiological effect of certain fatty acids, such as highly unsaturated fatty acids. Moreover, nutritional physiological effects of fatty acids depending on its position in triglycerides have been revealed primarily by the studies on structure and composition of human milk. For example, triglyceride with palmitic acid, a constituent fatty acid, in the 2-position is found to be better absorbed than triglyceride with palmitic acid in the 1,3-position [Filler et al., J. Nutr., 99, 293–298 (1969), Tomarelli et al., J. Nutr., 95, 583–590 (1968)].

Filler et al investigated on absorbability of fat and fatty acid by feeding milk formula containing fat with different 2-palmitoyl glyceride content to eleven newborn infants. In this case, absorbability of milk formula containing lard (3.63 g/100 ml, ca 85% of palmitic acid in the 2-position), or milk formula containing ester exchanged lard (3.72 g/100 ml, ca 33.9% of palmitic acid in the 2-position) was investigated. As the result, absorbability of palmitic acid was 94% for lard containing formula, and 58% for ester exchanged lard containing formula. That is, triglyceride with higher proportion of palmitic acid in the 2-position has proven to be predominantly excellent in absorbability. Further, since 2-palmitoylglyceride has high micelle forming ability, it is found to enhance absorbability of stearic acid (by 88% for lard, by 40% for ester exchanged lard).

Tomarelli and his co-workers studied on correlation between absorbability of fats and percentage of fatty acid in the 2-position by using human milk or fat mixture consisting of lard, butter, coconut oils which were administered to rats at 15% level as fat in the feed. As the result, remarkable correlation was demonstrated for palmitic acid, and to a lesser extent for myristic acid and oleic acid, but not for stearic acid.

For relation between the position and absorbability of behenic acid, it has been reported that triglyceride with behenic acid in the 2-position shows lower absorbability compared with triglyceride with behenic acid in the 1,3-position [Hiroyuki MORI, Shokuhin Kako Gijutsu, 11, 25–28 (1991)], and that triglyceride with linolic acid in the 2-position lowers cholesterol level in blood and liver compared with triglyceride with linolic acid in the 1,3-position [Yamamoto, Atherosclerosis, 13, 171–184 (1971)]. Thus, physiological effects of triglyceride are being revealed.

As mentioned above, palmitic acid in the 2-position of triglyceride is well absorbed. Vegetable oils such as palm oil are known to be rich in this fatty acid which is used in foodstuff. Palmitic acid is usually in the 1,3-position [Yushi Kagaku Binran, published by Maruzen, p 20 (1982)]. Lard is known to be a typical fat with high proportion of palmitic acid in the 2-position of triglyceride. In lard, however, the content of 2-palmitoyl-1,3-dioleylglycerol is insufficient, i.e., about 17%. In additions lard disadvantageously contains tri-saturated type triglyceride containing palmitic acid as well as stearic acid which is said to be poorly absorbed, for example, 2-palmitoyl-1,3-distearyglycerol.

Considering the above problems, the present inventors have studied intensively to develop well-digestible and well-absorbable edible oil and fat compositions. We analyzed structure and composition of edible oil and fat compositions with high proportion of palmitic acid in the 2-position using the latest techniques for analysis and separation and purification, and separated and purified the edible oil and fat composition and conducted nutritional experiment to confirm utility of 2-palmitoyl-1,3-dioleylglycerol. Thus, we have attained the present invention.

SUMMARY OF THE INVENTION

Accordingly, an object of the present invention is to provide well-digestible and well-absorbable edible oil and fat composition which contains a certain amount or more 2-palmitoyl-1,3-dioleylglycerol.

Another object of the present invention is to provide a process for production of well-digestible and well-absorbable edible oil and fat composition which contains a certain amount or more 2-palmitoyl-1,3-dioleylglycerol.

According to the present invention, edible oil and fat composition containing 2-palmitoyl-1,3-dioleylglycerol is fractionated to enhance the content of 2-palmitoyl-1,3-dioleylglycerol to 20% by weight or more, to produce well-digestible and well-absorbable edible oil and fat composition.

DETAILED DESCRIPTION OF THE INVENTION AND PREFERRED EMBODIMENTS

Any fats, which contains 5% by weight or more ("%" hereinafter means "% by weight"), preferably 10% or more 2-palmitoyl-1,3-dioleylglycerol, may be used as starting materials to produce the well-digestible and well-absorbable edible oil and fat composition of the present invention which contains a certain amount or more 2-palmitoyl-1,3-dioleylglycerol. Example of such fat includes lard or palm oil, or hydrogenated or ester exchanged oil thereof.

For production, these fats are gradually poured into solvent such as acetone heated at the temperature at which the fats can be completely dissolved. After completely mixed, the mixture was gradually cooled and maintained at a fixed temperature and fractionated to remove the separated solid fat. The cooling rate is preferably not more than 1° C. per hour. Rapid cooling results in remarkably reduced separation efficiency. The present inventors have found that, among conditions to concentrate certain molecule contained in fats, the temperature at which the fats are maintained to separate solid fat mostly affects the fractionation of the molecular species.

Table 1 shows the relation between fractionating temperature and composition of the fractionated material.

TABLE 1

| Fractionating Temperature(°C.) | OPO Content (%) | SSS Content (%) | Stearic Acid Content(%) | Yield (%) |
| --- | --- | --- | --- | --- |
| 25 | 20.68 | 1.92 | 12.99 | 94.52 |
| 20 | 21.69 | 0.82 | 12.48 | 90.10 |
| 15 | 21.45 | 0.67 | 11.33 | 87.13 |
| 10 | 22.88 | — | 8.87 | 71.52 |
| 5 | 26.39 | — | 7.37 | 61.34 |
| 0 | 26.38 | — | 6.69 | 52.13 |
| −5 | 26.30 | — | 5.41 | 44.44 |
| −10 | 23.91 | — | 4.98 | 40.97 |
| −18 | 22.50 | — | 4.50 | 41.31 |
| Pure Lard | 19.95 | 4.50 | 13.77 | — |

OPO: 2-Palmitoyl-1,3-dioleylglycerol
SSS: Triglyceride consisting of straight-chain saturated fatty acid containing 16 or more backbone carbon atoms
Yield: Weight ratio (%) of starting oil and fat to oil and fat after removal of solvent from filtrate According to the findings, fractionation of 2-palmitoyl-1,3-dioleylglycerol is advantageously carried out using triglyceride consisting of straight-chain saturated fatty acid having 16 or more backbone carbon atoms with poor absorbability or triglyceride with low content of stearic acid in a solvent at 10° C. or lower, preferably at 5—5° C. It is sufficient to maintain the triglycerides in the solvent for 24 hours or longer, preferably 48–168 hours, more preferably 72–144 hours. Solvent is removed from the liquid phase obtained after such fractionation according to the conventional method to provide the well-digestible and well-absorbable oil and fat composition of the present invention.

2-Palmitoyl-1,3-dioleylglycerol obtained according to the present invention is a well-digestible and well-absorbable oil and fat composition. The present invention provides edible oil and fat composition containing a certain amount or more 2-palmitoyl-1,3-dioleylglycerol which can be utilized as a raw material used in diets for infants or for the sick.

The following examples further illustrate the present invention. The examples are illustrative only and are not intended to limit the scope of the invention in any way.

EXAMPLE 1

Pure lard (containing 2-palmitoyl-1,3-dioleylglycerol, 18.9%; tri-saturated type triglyceride, 4.62%; and stearic acid, 13.8%)(1 kg) was stirred and dissolved in acetone (10 L) maintained at 40° C., then cooled to 4° C. at the rate of 1° C./hr with gently stirring, and maintained at the temperature for 144 hours. Subsequently, the mixture was rapidly filtered under reduced pressure using a Buchner funnel (diameter, 30 cm) to remove the separated solid. The filtrate was concentrated to remove the solvent. Distillation by the conventional manner provided the present edible oil and fat composition (containing 2-palmitoyl-1,3-dioleylglycerol, 26.4%; tri-saturated type triglyceride, less than detection limit; and stearic acid, 7.37%) (709 g).

The fatty acid composition of thus obtained edible oil and fat composition and pure lard, content of 2-palmitoyl-1,3-dioleylglycerol and tri-saturated type triglyceride containing stearic acid are shown in Table 2.

In the table, P, O and S mean palmitic acid, oleic acid and stearic acid, respectively. For example, "OPO" represents "1-oleyl-2-palmitoyl-3-oleylglycerol". "nd" means "not detected". For example, "C14:0" means "fatty acid having 14 carbon atoms and no unsaturated bond".

This edible oil and fat composition became liquid at 4° C. or higher.

TABLE 2

Composition of edible oil and fat composition

| | Lard Fractionated Oil (%) | Pure Lard (%) |
| --- | --- | --- |
| C14:0 | 2.45 | 2.05 |
| C16:0 | 23.36 | 25.74 |
| C16:1 | 4.47 | 3.60 |
| C18:0 | 7.37 | 13.77 |
| C18:1 | 49.74 | 46.91 |
| C18:2 | 11.77 | 10.94 |
| C18:3 | 0.84 | 0.59 |
| OPO | 26.14 | 18.4 |
| PPS, PSP | nd. | 2.1 |
| SPS, SSP | nd. | 2.4 |
| SSS | nd. | 0.4 |

EXPERIMENT 1

Using the present edible oil and fat composition prepared in Example 1 and pure lard as a control, an experiment was carried out to compare absorbability.

Compositions of the test feed are shown in Table 3.

The composition of the test feed was the same as that of AIN-76 composition except that the amount of the added lipid was 10%.

17-day old rats (Japan Charles River), which had been weaned early were used. The rats were divided into two groups (6 rats/group). Each group was fed the test diet for 2 weeks. Feces were collected for the 3-day period of 12–14 days after starting of feeding. According to the conventional method, lipid was extracted from these feces and absorbability was calculated.

Table 4 shows absorbability of oil and fat, and fatty acid.

TABLE 3

Test Feed

| | The Present Fat Composition | Pure Lard |
| --- | --- | --- |
| Casein | 20.0 | 20.0 |
| DL-Methionine | 0.3 | 0.3 |
| The present Oil and Fat | 10.0 | 0.0 |
| Pure Lard | 0.0 | 10.0 |
| Salt Mixture | 3.5 | 3.5 |
| Vitamin Mixture | 1.0 | 1.0 |
| Choline Bitartrate | 0.2 | 0.2 |
| Cellulose | 5.0 | 5.0 |
| Cornstarch | 15.0 | 15.0 |
| Sucrose | 45.0 | 45.0 |

Salt mixture and vitamin mixture were according to AIN-76 composition.

TABLE 4

| | Absorption | |
| --- | --- | --- |
| | | |
| Total Lipid | 92.1 ± 0.9* | 84.3 ± 1.1 |
| Palmitic acid | 90.0 ± 0.5* | 85.1 ± 0.9 |
| Oleic acid | 99.0 ± 0.4 | 98.2 ± 0.5 |
| Stearic acid | 82.1 ± 8.1* | 60.2 ± 7.8 |

*Significantly different from pure lard group ($p < 0.05$).

In the present oil and fat composition group with high proportion of 2-palmitoyl-1,3-dioleylglycerol and less proportion of tri-saturated type triglyceride containing stearic acid, absorbability of total lipid was significantly enhanced compared with the pure lard group. As for fatty acids palmitic acid and stearic acid showed significantly enhanced absorbability.

Absorption in the present invention was calculated using the following equation:

Absorption (%)={[ingested lipid (or certain fatty acid) in feed—excreted lipid (or certain fatty acid) in feces]/ingested lipid (or certain fatty acid) in feed}×100

What is claimed is:

1. A process for producing an easily-digestible and easily-absorbable edible oil or fat composition which contains 20% by weight or more 2-palmitoyl-1,3-dioleylglycerol, said process comprising:
   a. providing an edible oil or fat containing at least about 5% by weight, but less than 20% by weight, of 2-palmitoyl-1,3-dioleylglycerol,
   b. contacting the oil or fat with an organic solvent at a temperature at which the oil or fat is dissolved in the solvent thereby forming a liquid mixture;
   c. cooling the mixture at a rate of not more than about 1° C. per hour to a reduced temperature thereby causing a portion of the oil or fat to solidify and maintaining the mixture at said reduced temperature; and
   d. separating the solid oil or fat from the mixture;

wherein the liquid oil or fat remaining after step (d) comprises about 20% by weight or more of 2-palmitoyl-1,3-dioleylglycerol.

2. The process according to claim 1 wherein the oil or fat composition containing at least about 5% by weight but less than 20% by weight, of 2-palmitoyl-1,3-dioleylglycerol is lard, palm oil or a hydrogenated and ester exchanged oil or fat thereof.

3. The process according to claim 2, wherein the solvent is acetone.

4. The process of claim 1 wherein step (c) is carried out by cooling the mixture to a temperature of about 25° C. or less, and maintaining the mixture at the temperature for a time sufficient for the oil or fat portion to solidify.

5. The process of claim 1 wherein the mixture is maintained at the reduced temperature for at least 24 hours.

6. The process of claim 1 wherein step (d) is carried out by filtering the mixture to remove the solid oil or fat.

7. The process of claim 1 further comprising after step (d), the step of removing the solvent from the liquid oil or fat.

* * * * *